US011354825B2

(12) United States Patent
Lin et al.

(10) Patent No.: US 11,354,825 B2
(45) Date of Patent: Jun. 7, 2022

(54) METHOD, APPARATUS FOR GENERATING SPECIAL EFFECT BASED ON FACE, AND ELECTRONIC DEVICE

(71) Applicant: Beijing Microlive Vision Technology Co., Ltd, Beijing (CN)

(72) Inventors: Xin Lin, Beijing (CN); Jing Wang, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/997,551

(22) PCT Filed: Dec. 25, 2018

(86) PCT No.: PCT/CN2018/123639
§ 371 (c)(1),
(2) Date: Aug. 19, 2020

(87) PCT Pub. No.: WO2020/019663
PCT Pub. Date: Jan. 30, 2020

(65) Prior Publication Data
US 2021/0366163 A1    Nov. 25, 2021

(30) Foreign Application Priority Data
Jul. 27, 2018 (CN) .......................... 201810838432.8

(51) Int. Cl.
*G06T 11/00* (2006.01)
*G06F 3/04845* (2022.01)
(Continued)

(52) U.S. Cl.
CPC .......... *G06T 11/00* (2013.01); *G06F 3/04845* (2013.01); *G06F 3/04847* (2013.01);
(Continued)

(58) Field of Classification Search
CPC . G06T 11/00; G06T 2200/24; G06F 3/04845; G06F 3/04847; G06F 3/04842; G06K 9/00221
See application file for complete search history.

(56) References Cited

U.S. PATENT DOCUMENTS

2011/0304607 A1*   12/2011   Ito .......................... G06T 7/251
                                                                    345/419
2012/0223956 A1    9/2012   Saito et al.
(Continued)

FOREIGN PATENT DOCUMENTS

CN         103024167 A       4/2013
CN         104240274 A      12/2014
(Continued)

OTHER PUBLICATIONS

International Patent Application No. PCT/CN2018/123639; Int'l Search Report; dated Apr. 29, 2019; 3 pages.

*Primary Examiner* — William A Beutel
(74) *Attorney, Agent, or Firm* — BakerHostetler

(57) ABSTRACT

A method and an apparatus for generating a special effect based on a face, an electronic device, and a computer readable storage medium are provided. With the method, a standard face image is displayed, a reference point is selected on the standard face image in response to a received reference point selecting command, a special effect is formed on the standard face image in response to a received special effect forming operation, a parameter of the special effect is generated, a first face image recognized by an image sensor is acquired, and the special effect is generated on the first face image based on the parameter of the special effect and the reference point.

18 Claims, 11 Drawing Sheets

(51) Int. Cl.
*G06F 3/04847* (2022.01)
*G06V 40/16* (2022.01)
*G06F 3/04842* (2022.01)

(52) U.S. Cl.
CPC .......... *G06V 40/16* (2022.01); *G06F 3/04842* (2013.01); *G06T 2200/24* (2013.01)

(56) References Cited

U.S. PATENT DOCUMENTS

| | | | |
|---|---|---|---|
| 2014/0033136 A1* | 1/2014 | St. Clair | G06F 3/04883 715/863 |
| 2016/0058158 A1* | 3/2016 | Tomita | H04N 5/23222 348/78 |
| 2017/0132768 A1* | 5/2017 | Bedi | H04L 67/36 |
| 2018/0249200 A1* | 8/2018 | Wang | H04N 5/23219 |
| 2020/0252553 A1* | 8/2020 | Luo | H04N 5/232933 |

FOREIGN PATENT DOCUMENTS

| | | |
|---|---|---|
| CN | 105303523 A | 2/2016 |
| CN | 106341720 A | 1/2017 |
| CN | 106845400 A | 6/2017 |
| CN | 106875332 A | 6/2017 |
| CN | 107452034 A | 12/2017 |
| CN | 107679497 A | 2/2018 |
| CN | 107888845 A | 4/2018 |
| CN | 108010037 A | 5/2018 |
| CN | 108022279 A | 5/2018 |
| CN | 108259496 A | 7/2018 |
| CN | 108958610 A | 12/2018 |
| JP | 2005-242566 A | 9/2005 |
| JP | 2006-260198 A | 9/2006 |
| JP | 2009-053981 A | 3/2009 |
| JP | 2015-034836 A | 2/2015 |
| WO | WO 2014/171142 A1 | 10/2014 |

* cited by examiner

METHOD, APPARATUS FOR GENERATING SPECIAL EFFECT BASED ON FACE, AND ELECTRONIC DEVICE

The present application is the National Phase Application of International Patent Application No. PCT/CN2018/123639, titled "METHOD, APPARATUS FOR GENERATING SPECIAL EFFECT BASED ON FACE, AND ELECTRONIC DEVICE", filed on Dec. 25, 2018, which claims the priority to Chinese Patent Application No. 201810838432.8, titled "METHOD, APPARATUS FOR GENERATING SPECIAL EFFECT BASED ON FACE, AND ELECTRONIC DEVICE", filed on Jul. 27, 2018 with the Chinese Patent Office, both of which are which is incorporated herein by reference in their entireties its entirety.

FIELD

The present disclosure relates to the field of image technologies, and in particular to a method and an apparatus for generating a special effect based on a face, a hardware device, and a computer readable storage medium.

BACKGROUND

With the development of computer technologies, intelligent terminals are widely used in various applications, for example, the intelligent terminals may be used to listen to music, play games, chat online, take photos and the like. An intelligent terminal with a camera may have a resolution of more than 10 million pixels, which achieves a high definition and a photographing effect of a professional camera.

At present, for taking a photo or a video with an intelligent terminal, a photographing software built-in at the factory may be used to realize a conventional photographing effect of photos and videos, and an application (APP) downloaded from a network may also be used to realize a photographing effect of photos and videos with an additional function.

In a current APP for forming special effects, special effects are pre-set and cannot be edited flexibly, and the special effects are only be fixed at fixed positions on an image.

SUMMARY

According to an aspect of the present disclosure, a method for generating a special effect based on a face is provided. The method includes: displaying a standard face image; selecting a reference point on the standard face image in response to a received reference point selecting command; forming a special effect on the standard face image in response to a received special effect forming operation; generating a parameter of the special effect; acquiring a first face image recognized by an image sensor; and generating the special effect on the first face image based on the parameter of the special effect and the reference point.

Further, the standard face image includes multiple regions. The reference point is located in one of the multiple regions. The special effect is located in the region where the reference point is located.

Further, the number of the special effect is more than one, and the more than one special effect corresponds to different reference points and is located in different regions.

Further, before the generating a parameter of the special effect, the method further includes: setting a trigger condition of the special effect in response to a received trigger condition setting command.

Further, before the generating a parameter of the special effect, the method further includes: setting a play order and/or a play time of the special effect in response to a received play setting command.

Further, the play order is set based on a message, and the message is set to control starting or stopping the special effect.

Further, the parameter of the special effect includes: a position of the special effect and a size of the special effect.

Further, the position of the special effect and the size of the special effect are respectively determined based on a position of the reference point and a distance between reference points.

Further, the forming a special effect on the standard face image in response to a received special effect forming operation includes: selecting a resource package in response to a received resource package selecting command; analyzing the resource package and displaying a configuration interface; configuring a resource in the resource package in response to a received configuration command; and generating the special effect based on the configured resource, and displaying the special effect on the standard face image.

Further, the configuring a resource in the resource package includes: configuring a size, a position, and a rotation center of the resource.

According to another aspect of the present disclosure, an apparatus for generating a special effect based on a face is provided. The apparatus includes: a display module, a reference point selecting module, a special effect forming module, a special effect parameter generating module, a face image acquiring module, and a special effect generating module. The display module is configured to display a standard face image. The reference point selecting module is configured to select a reference point on the standard face image in response to a received reference point selecting command. The special effect forming module is configured to form a special effect on the standard face image in response to a received special effect forming operation. The special effect parameter generating module is configured to generate a parameter of the special effect. The face image acquiring module is configured to acquire a first face image recognized by an image sensor. The special effect generating module is configured to generate the special effect on the first face image based on the parameter of the special effect and the reference point.

Further, the standard face image includes multiple regions. The reference point is located in one of the multiple regions. The special effect is located in the region where the reference point is located.

Further, the number of the special effect is more than one, and the more than one special effect corresponds to different reference points and is located in different regions.

Further, the apparatus for generating a special effect based on a face further includes a trigger condition setting module. The trigger condition setting module is configured to set, before generating a parameter of the special effect, a trigger condition of the special effect in response to a received trigger condition setting command.

Further, the apparatus for generating a special effect based on a face further includes a play setting module. The play setting module is configured to set, before generating a parameter of the special effect, a play order and/or a play time of the special effect in response to a received play setting command.

Further, the play order is set based on a message, and the message is set to control starting or stopping the special effect.

Further, the parameter of the special effect includes: a position of the special effect and a size of the special effect.

Further, the position of the special effect and the size of the special effect are respectively determined based on a position of the reference point and a distance between reference points.

Further, the special effect forming module includes: a selecting module, a analyzing and display module, a resource configuring module, and a first display module. The selecting module is configured to select a resource package in response to a received resource package selecting command. The analyzing and display module is configured to analyze the resource package and display a configuration interface. The resource configuring module is configured to configure a resource in the resource package in response to a received configuration command. The first display module is configured to generate the special effect based on the configured resource, and display the special effect on the standard face image.

Further, the configuring a resource in the resource package includes: configuring a size, a position, and a rotation center of the resource.

According to another aspect of the present disclosure, an electronic device is provided. The electronic device includes a memory and a processor. The memory is configured to store non-transitory computer readable instructions. The processor is configured to execute the computer readable instructions to perform the steps described in any of the above methods.

According to another aspect of the present disclosure, a computer readable storage medium is provided. The computer readable storage medium is configured to store non-transitory computer readable instructions. The non-transitory computer readable instructions, when being executed by a computer, cause the computer to perform the steps described in any of the above methods.

A method and an apparatus for generating a special effect based on a face, an electronic device, and a computer readable storage medium are provided according to the embodiments of the present disclosure. The method for generating a special effect based on a face includes: displaying a standard face image; selecting a reference point on the standard face image in response to a received reference point selecting command; forming a special effect on the standard face image in response to a received special effect forming operation; generating a parameter of the special effect; acquiring a first face image recognized by an image sensor; and generating the special effect on the first face image based on the parameter of the special effect and the reference point. According to the embodiments of the present disclosure, with the special effect forming operation, a user can conveniently configure and edit a special effect. Since a face feature point is selected as a reference point and a relative relationship between the special effect and the reference point is recorded, the difficulty and the time period for editing the special effect are greatly reduced. Further, the special effect can always change following a change of a face, such that the experience effect of the user is improved.

The above description is only an overview of the technical solution of the present disclosure. In order to more clearly understand the technical solution of the present disclosure, to implement the technical solution according to the contents of the specification, and in order to make the above and other objects, features and advantages of the present disclosure more apparent, preferred embodiments are described hereinafter in detail with reference to the drawings.

BRIEF DESCRIPTION OF THE DRAWINGS

FIG. 5b is a schematic structural diagram of a special effect forming module in the apparatus for generating a special effect based on a face according to the embodiment shown in FIG. 5a;

DETAILED DESCRIPTION OF EMBODIMENTS

Figure 1:
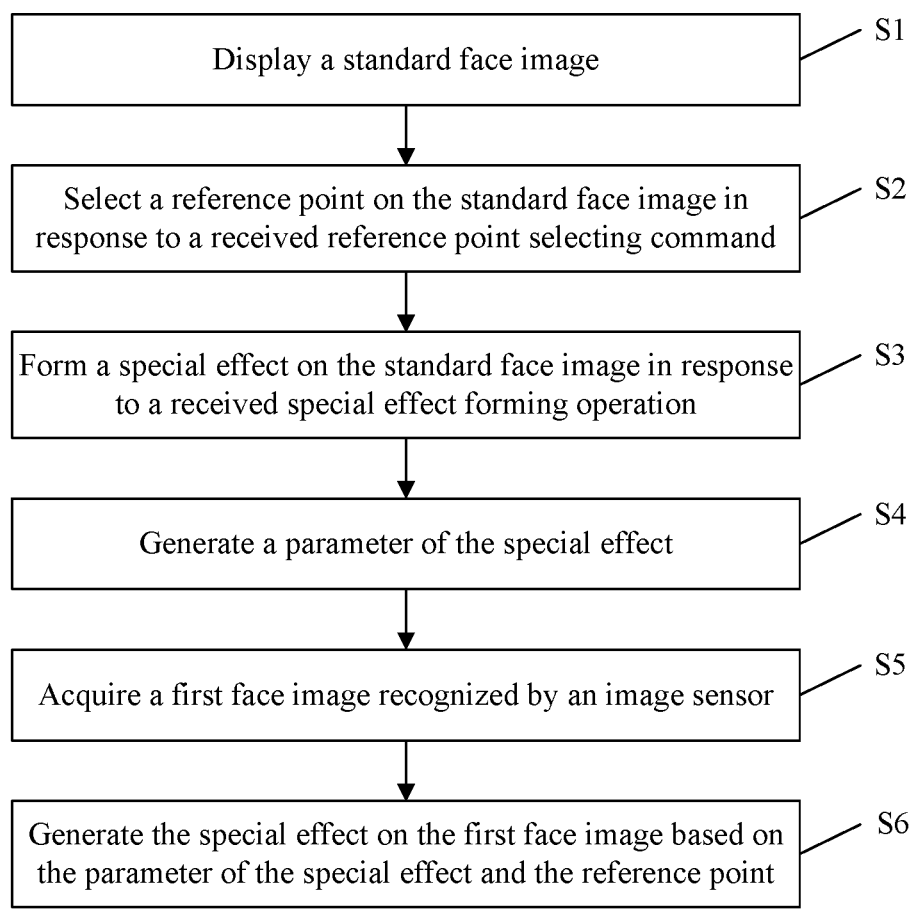
FIG. 1 is a flow chart of a method for generating a special effect based on a face according to an embodiment of the present disclosure.

The present disclosure is described below by specific embodiments, and those skilled in the art can readily understand other advantages and functions of the present disclosure from the description herein. Apparently, the described embodiments are only some, rather than all of the embodiments of the present disclosure. The present disclosure may be embodied or applied in various other specific embodiments, and the details of the present disclosure may also be variously modified or changed based on different viewpoints and applications without departing from the spirit and scope of the present disclosure. It should be noted that the embodiments in the present disclosure and features in the embodiments may be combined with each other without causing conflict. Any other embodiments obtained by those skilled in the art based on the embodiments of the present disclosure without any creative work should fall within the protection scope of the present disclosure.

It should be noted that the following description sets forth various aspects of the embodiments within the scope of the appended claims. It should be apparent that the aspects described herein may be embodied in a variety of forms and that any specific structure and/or function described herein is merely illustrative. Based on the present disclosure, those skilled in the art should appreciate that one aspect described herein may be implemented independently of any other aspects and two or more of these aspects may be combined in various ways. For example, an apparatus may be implemented and/or a method may be practiced using any number of the aspects set forth herein. In addition, such an apparatus may be implemented and/or such a method may be practiced using other structures and/or functionalities than one or more of the aspects set forth herein.

It should be noted that the illustrations in the following embodiments merely illustrate the basic concept of the present disclosure in a schematic manner, and only the components related to the present disclosure are shown in the drawings, instead of showing the drawings according to the number, shape and size of component in actual implementation. The shape, number, and scale of the component in an actual implementation of the present disclosure may be changed randomly, and the layout pattern of the component may also be more complex.

In addition, in the following description, specific details are provided to facilitate a thorough understanding of the embodiments. However, those skilled in the art should appreciate that the aspects can be practiced without these specific details.

In order to improve an experience effect of a user, a method for generating a special effect based on a face is provided according to an embodiment of the present disclosure. As shown in FIG. 1, the method for generating a special effect based on a face mainly includes the following steps S1 to S6.

In step S1, a standard face image is displayed.

A standard face image is displayed on a display device, where the standard face image is a predetermined image of a face. Generally, the standard face image is an image of a front face, and has a feature point pre-set thereon. The number of the feature point may be set by a user freely according actual needs. A feature point of an image refers to a point in the image that has a distinctive characteristic, which may effectively reflect an essential feature of the image and identify a target object in the image. If the target object is a face, it is required to acquire a key point of the face, and if the target image is a house, it is required to acquire a key point of the house. A method for acquiring a key point is described by taking a face as an example. A contour of the face mainly includes five parts, that is, eyebrows, eyes, a nose, a mouth, and cheeks. In addition, the contour of the face may further include pupils and nostrils. Generally, about 60 key points are required to achieve a complete description of the contour of the face. If it is only required to describe a basic structure of the face without describing details of each part or without describing the cheeks, the number of the key point may be reduced. If it is required to describe the pupils and nostrils or even more detailed features of the face, the number of the key point may be increased. In order to extracting a key point on a face image, it is required to determine a coordinate of a position of each key point of the contour of the face in the face image, that is, to position the key point, which is performed based on a feature corresponding to the key point. In a case of obtaining an image feature that can clearly identify the key point, searching and comparison are performed on the face image based on the image feature, to accurately position the key point on the face image. Since a feature point occupies only a small area in an image (which is usually only several to tens of pixels in size), and a region occupied by a feature corresponding to the feature point in the image is usually very limited and localized. At present, there are the following two feature extraction manners: (1) one-dimensional image feature extraction manner along a vertical direction of the contour; (2) two-dimensional image feature extraction manner in a square neighborhood of a feature point. The above two manners may be implemented in various ways, such as an ASM or AAM method, a statistical energy function method, a regression analysis method, a deep learning method, a classifier method, and a batch extraction method. The number of the key point, an accuracy and a speed varies depending on the ways for performing feature extraction, which are applicable to different application scenarios.

In step S2, a reference point is selected on the standard face image in response to a received reference point selecting command.

In an embodiment, the reference point is a face feature point, and one or more reference points may be selected. In an implementation, the user may send a selecting command via an input device such as a mouse or a keyboard. For example, the user may click on a feature point displayed on a display device using the mouse, or select a feature point by inputting the number of the feature point with the keyboard, and use the selected feature point as a reference point. The reference point is used for recording a relative position and a size proportion of the special effect on the face.

In step S3, a special effect is formed on the standard face image in response to a received special effect forming operation.

In an embodiment, the received special effect forming operation may be used to form a special effect sticker, where the special effect sticker may be a two-dimensional sticker. The two-dimensional sticker is covered on the face to display the special effect. For the face, the special effect may be a static special effect, for example, a picture, or a dynamic special effect, for example, a multi-frame animation. In a case of forming a special effect, a resource package selecting command sent by the user is received, where the resource package includes materials for forming the special effect, such as pictures, sounds, and videos. A resource package is selected in response to the resource package selecting command. If there is no material in the resource package, a material or a resource package may be imported. In a case that the resource package is selected, the resource package is analyzed and a configuration interface is displayed. For example, if the resource package includes a picture that shows a pair of glasses and the glasses are displayed at a default position, a configuration interface is displayed beside the glasses, where the configuration interface includes an attribute parameter of the glasses, and the attribute parameter includes a position, a rotation center, a size, and the like. The user may configure the attribute parameter, and a special effect of glasses is generated based on the configuration. The special effect covers on the standard face image, and the position, the size, and the rotation center of the resource may be respectively controlled by a position control, a size control, and a rotation center control. Further, typically, the user may adjust the position of the two-dimensional sticker by dragging a zoom box of the two-dimensional sticker, and the user may adjust the size of the two-dimensional sticker by dragging a corner of the zoom box of the two-dimensional sticker. Alternatively, the user may zoom the standard face image by a canvas zooming command, to indirectly realize the effect of adjusting the size of the two-dimensional sticker. Any feature point may be set as the rotation center, and the rotation center may be selected by clicking on the feature point using a mouse or directly input a number of the feature point in the configuration interface. In a case that the rotation center is selected, the two-dimensional sticker may be rotated about the rotation center in response to a rotation command. The resource packet may include a frame sequence, and the user may configure each frame separately. The above configuration and attribute parameter are only exemplary and are not intended to limit the present disclosure. In fact, any attribute parameter required to be configured or configurable may be used in the technical solutions of the present disclosure.

In step S4, a parameter of the special effect is generated.

Figure 2:
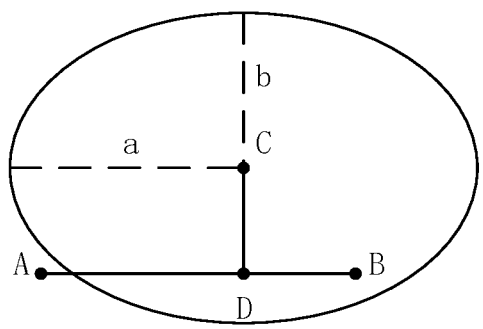
FIG. 2 is a schematic diagram of a step for generating a parameter of a special effect according to the embodiment shown in FIG. 1.

In an embodiment, the parameter of the special effect includes at least a position of the special effect and a size of the special effect. In the embodiment, the position of the special effect and the size of the special effect are a relative position and a relative size of the special effect on the standard face image, which are represented by reference points. As shown in FIG. 2, a feature point A and a feature point B are selected as reference points, and the special effect is in an ellipse. For the ellipse, a point C indicates a center point, a indicates a length of a long axis, b indicates a length of a short axis, and a point D indicates a vertical point of a vertical line from the point C to a line segment AB. The coordinate of the point A is represented as $(X_A, Y_A)$, the coordinate of the point B is represented as $(X_B, Y_B)$, the coordinate of the point C is represented as $(X_C, Y_C)$, and the coordinate of the point D is represented as $(X_D, Y_D)$, and the following four linear difference coefficients may be obtained:

$$\lambda_1 = \frac{AD}{AB}, \lambda_2 = \frac{CD}{AB}, \lambda_3 = \frac{a}{AB}, \lambda_4 = \frac{b}{AB},$$

where AB, AD, and CD each represents a length of a line segment:

$$AB = \sqrt{(X_A - X_B)^2 + (Y_A - Y_B)^2},$$

$$AD = \sqrt{(X_A - X_D)^2 + (Y_A - Y_D)^2},$$

$$CD = \sqrt{(X_C - X_D)^2 + (Y_C - Y_D)^2},$$

In a standard face image, the coordinates of the points A, B, C and D, and values of a and b are all known. Therefore, relative positions of the center point C relative to the reference points A and B and relative lengths of the long and short axes of the ellipse relative to the reference points A and B may be recorded by using the above four linear difference coefficients. Where $\lambda_1$ and $\lambda_2$ are respectively used to record the relative positions of the center point C relative to the reference points A and B, $\lambda_3$ is used to record the relative length of the long axis of the ellipse, and $\lambda_4$ is used to record the relative length of the short axis of the ellipse, and the generated parameter of the special effect includes at least the four linear difference coefficients. In the above embodiment, since the special effect is elliptical, two difference coefficients are required to respectively record relative lengths of the long and short axes. However, in practice, the special effect may have an irregular shape, then the size of the special effect may be represented by an outer frame of the special effect. The outer frame of the special effect may be a minimum rectangle containing the special effect. Specifically, four straight lines may be formed by successively connecting four points located at an outermost periphery of the special effect, and a right-angled rectangle surrounded by the four straight lines is referred to as a minimum rectangle, and a center of the minimum rectangle is taken as a center point of the special effect. In this way, the relative position and relative size of the special effect may be indicated by using the above four linear difference coefficients regardless of the shape of the special effect. The parameter of the special effect may further include a rotation center, which may be directly represented by a feature point, and in this case, it is only required to record the number of the feature point. For a rotation center other than the feature point, the rotation center may be recorded in the above manner for recording a center point. Specifically, the rotation center and the center point may be superposed.

In step S5, a first face image recognized by an image sensor is acquired.

In this step, a face image recognized by a camera is acquired. The face image may indicate a recognized face of a real human, or a face recognized from an image or video including the face captured by a camera, which is not limited in the present disclosure. In addition, the face image is different from the standard face image.

In order to recognize a face image, it is required to detect a face in an image. In a face detection process, searching is performed on an image or an image sequence according to a certain strategy, to determine positions and regions of all faces, such that it may be determined whether there is a face in each image or image sequence and then the number and space distribution of the face are determined. Generally, there are the following four face detection manners: (1) a manner based on a prior knowledge, in which the face is encoded using a rule base which is formed based on typical faces, and position is performed on the face based on a relationship between facial features; (2) a feature invariant manner, in which stable features are determined in the case of changing a posture, a viewing angle, or a lighting condition, and a face is determined using these features; (3) a template matching manner, in which several standard face patterns are stored to describe an entire face and facial features, and relationships between an input image and the stored patterns are calculated for performing detection; (4) a manner based on an appearance, which is completely different from the template matching method, and in which models are obtained by learning with a training image set for performing detection. Here, an implementation of the manner (4) is described to illustrate the face detection process. First, features are extracted to perform modeling. In the implementation, a Haar feature is used as a key feature for determining a face. The Haar feature is a simple rectangular feature with a fast extraction speed. The feature template used for calculating the Haar feature is usually a simple rectangle combination consisting of two or more congruent rectangles, where the feature template includes two kinds of rectangles, that is, black and white. Then, a portion of a large number of Haar features that play a key role are determined by using an AdaBoost algorithm, and these features are used to generate an effective classifier, and a face in an image may be detected by using the generated classifier. In this implementation, the number of the face in the image may be one or more.

It is to be understood that since the face detection manners each has its own advantages and are applicable to different applications, multiple different detection manners may be set, and switching may be automatically performed among these manners for different environments. For example, for an image with a simple background environment, a method with a poor detection rate and a fast detection speed may be used; for an image with a complex background environment, a method with a high detection rate and a slow detection speed may be used. In addition, multiple methods may be used for multiple times of detections on the same image to increase the detection rate.

In step S6, the special effect is generated on the first face image based on the parameter of the special effect and the reference point.

In this step, based on the parameter of the special effect generated in step S4 and the number of the reference point, the same special effect as that on the standard face image is generated on the face image recognized by a camera.

There is a mapping relationship between the special effect on a standard face image and the special effect on a first face image collected by an image sensor, and depending on the mapping relationship, the special effect may include a fixed special effect and a tracking special effect. In an embodiment, a fixed special effect is generated, which is formed simply, where it is only required to set an absolute position of an entire range of the special effect relative to the image sensor. In an implementation, a display device is arranged in a one-to-one correspondence in pixels relative to an image acquisition window of the image sensor, and a position of the special effect in the display device is determined, then the special effect is generated at a corresponding position of the image acquired by the image acquisition window of the image sensor. The special effect is processed simply and the operation is easy, and the parameters used in the implementation are all corresponding to the position of the image acquisition window. In another embodiment, in a case of generating a special effect image, a feature point of the standard face image in step S1 is firstly acquired, and a position of the special effect on the standard face image is determined based on the feature point. A first face image corresponding to the standard face image is recognized from an image acquired by an image sensor. The position determined on the standard face image is mapped to a position in the first face image. The special effect is generated on the first face image to generate a special effect image. In this implementation, a relative position of the special effect in the first face image is determined, and the special effect is always located at the relative position no matter how the first face image moves and changes, such that a tracking special effect is realized. In a typical application, the standard face image subjecting to a triangulation process has 106 feature points, and relative positions of the special effect relative to the feature points are used to determine a relative position of a range of the special effect in the face image. The face image acquired by a camera also subjects to the triangulation process, and if the face in the camera moves or rotates, the special effect can be fixed at the relative position of the face, realizing an effect of a tracking special effect.

For example, feature points numbered with 19 and 20 are used as reference points, thus feature points with the same numbers are selected in a first face image. Feature points A' and B' respectively numbered with 19 and 20 are searched for in the first face image, and coordinates of the two points in the first face image are acquired. A vertical point D' of a vertical line from a center point C' of the special effect to a line segment between the point A' and the point B' is calculated based on the linear difference coefficient $\lambda_1$, a position of the point C' is calculated based on the linear difference coefficient $\lambda_2$, and a size of the special effect is calculated based on the linear difference coefficients $\lambda_3$ and $\lambda_4$, then the special effect on the first face image is scaled. Thus, by using the parameter of the special effect and the reference point, a step of mapping the special effect on the first face image is performed.

It is to be understood that if multiple face images are recognized from an image, the user may generate a special effect on one face image, or may generate the same special effect or different special effects on multiple face images. For example, in a case of forming a special effect, the standard faces may be respectively numbered with, for example, ID1 and ID2, and special effects are respectively formed on the standard face images ID1 and ID2, where the special effects may be the same with or different from each other. If multiple face images are recognized from a camera, special effects are generated on the multiple face images according to a recognition order. For example, if a first face is recognized, the special effect on the standard face image ID1 is generated on the first face, and if a second face is recognized later, the special effect on the standard face image ID2 is generated on the second face. If only the standard face image ID1 is formed with a special effect, the special effect on the standard face image ID1 may be generated on both the first face and the second face, or the special effect on the standard face image ID1 may be only generated on the first face.

In an embodiment, the standard face image is divided into multiple regions, such as an eye region, a nose region, a mouth region, a cheek region, an eyebrow region, and a forehead region. Each of the regions includes an optimized feature point, which is a more representative feature point selected by data analysis. The feature point represents the region in which the feature point is located. For example, if a feature point in the eye region is selected as a reference point, this indicates that the eye region is determined as a target region for forming a special effect. Multiple sub special effects may be formed for each region, and each sub special effect separately tracks the region in which it is located. The sub special effects are combined together to form a special effect. The advantage of the above operation is that the number of feature points is reduced, and it is unnecessary to select one feature point from multiple feature points as a reference point. In addition, all the feature points displayed to the user are optimized, and once the user selects a region, a feature point in the region is also selected. A large special effect may be split into multiple sub special effects, to reduce the difficulty in forming the special effect.

In the embodiment of the present disclosure, a face special effect is edited on a standard face image, and then the face special effect is mapped to an image acquired by an image sensor based on a relative relationship between a selected reference point and an attribute of the special effect. In a conventional technology, since a special effect is formed with a third-party tool, the flexibility in using the special effect is low, and the special effect cannot be configured in real time. Moreover, the special effect is only fixed at a fixed position of an image window, and when a face moves or rotates, the special effect cannot moves or rotates tracking the face, resulting in a reduced user experience. In this embodiment, with the special effect forming operation, the user may conveniently configure and edit a special effect. Further, since a face feature point is selected as a reference point and a relative relationship between the special effect and the reference point is recorded, the special effect changes tracking the change of the reference point no matter how a first face image acquired by an image sensor moves or rotates. Therefore, compared with the conventional technology, the difficulty and the time period in editing the special effect are greatly reduced, and the special effect always changes tracking the change of the face, thus improving the user experience.

Figure 3:
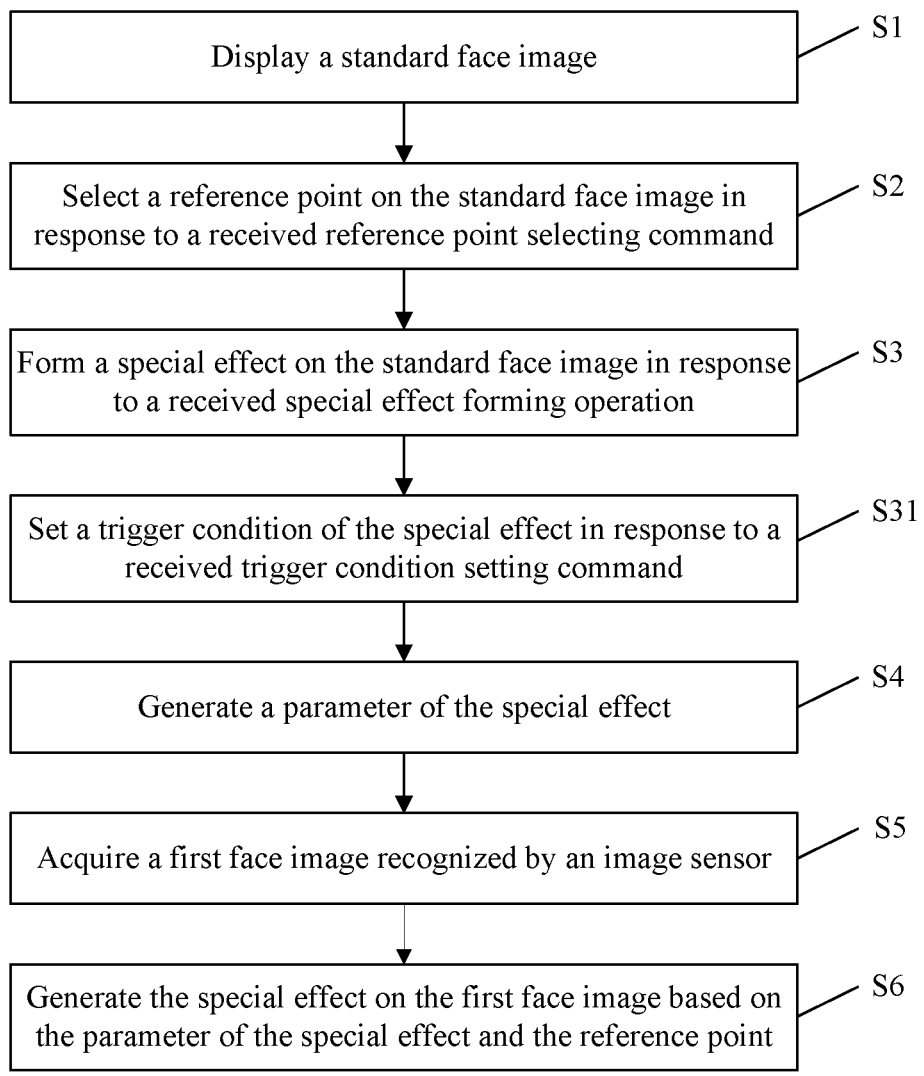
FIG. 3 is a flow chart of a method for generating a special effect based on a face according to another embodiment of the present disclosure.

In an embodiment, as shown in FIG. 3, before performing step S4, that is, before generating a parameter of the special effect, the method for generating a special effect based on a face may further include a step S31.

In step S31, a trigger condition of the special effect is set in response to a received trigger condition setting command.

In the embodiment, a special effect is displayed only when a trigger condition is met, where an action, an expression, or a sound of the user, a terminal parameter, or the like may be set as the trigger condition. The action may be a facial action, such as blinking, opening the mouth, shaking the head, nodding, and raising eyebrows. For example, if the special effect is a two-dimensional sticker of glasses, the trigger condition may be set as quickly blinking twice. When detecting that the user quickly blinks twice, the two-dimensional sticker of glasses is displayed on the user's eyes. The expression may be a happy expression, a depressed expression, an angry expression, or the like. For example, if the special effect is a two-dimensional sticker of tears, the trigger condition may be set as a depressed expression. When detecting that the user has the depressed expression, the two-dimensional sticker of tears is displayed below the user's eyes. If a sound is set as the trigger condition, a voice of the user or an environmental sound may be detected, and when a predetermined sound is detected, a corresponding special effect is triggered. If a terminal parameter is set as the trigger condition, a parameter of each component in the terminal, such as a gesture or a shaking action of the terminal, may be detected, and a corresponding special effect is triggered by the gesture or the shaking action. The trigger conditions are not listed in detail herein. It should be understood that the trigger condition may be any trigger condition that is applicable to the technical solution of the present disclosure, and the number of the trigger condition may be one or more, which is not limited herein. The trigger condition may be used to trigger starting or stopping a special effect. The triggering starting a special effect means that a corresponding special effect appears when the trigger condition is met. The triggering stopping a special effect means that a corresponding special effect disappears when the trigger condition is met. The trigger condition may further include a delay time period from triggering, which means a time period after which a special effect appears or disappears.

In the embodiment, the parameter of the special effect further includes a trigger condition of the special effect.

Figure 4:
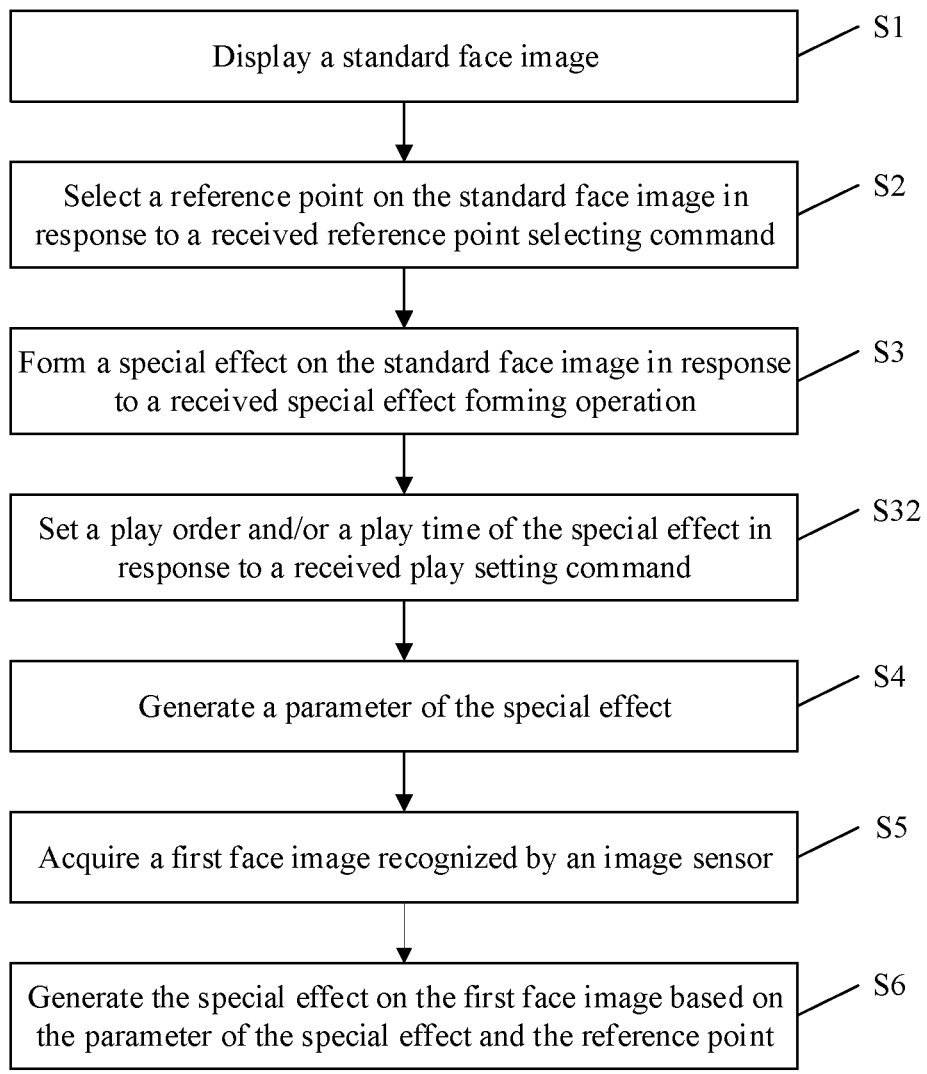
FIG. 4 is a flow chart of a method for generating a special effect based on a face according to another embodiment of the present disclosure.

In an embodiment, as shown in FIG. 4, before performing the step S4, that is, before generating a parameter of the special effect, the method for generating a special effect based on a face may further include a step S32.

In step S32, a play order and/or play time of the special effect is set in response to a receiving a play setting command.

In the embodiment, a play order and play time of multiple special effects may be set. In an embodiment, three special effects are included, namely, a special effect 1, a special effect 2, and a special effect 3. If a play order of the special effects is set as an order of the special effect 1, the special effect 3, and the special effect 2, the special effects are played sequentially according to the order. In a case of setting the play order, the play order of the special effects may be set by directly numbering the special effects. For example, the play order of special effect 1 is 1, the play order of special effect 2 is 3, and the play order of special effect 3 is 2. Alternatively, a time axis is displayed in a visible way, and IDs of the special effects are set directly on the time axis. For example, a time axis is displayed, and the special effect 1, the special effect 3, and the special effect 2 are sequentially labeled on the time axis along a positive direction of the time axis to set a play order of the special effects. By default, the special effects are played successively, that is, the special effects are displayed regardless of the play time, and only when a frame sequence of one special effect is played, a next special effect is played. In the embodiment, a play time of a special effect may also be set, where the play time may indicate a length of a time period or the number of times for which the special effect is played. For example, the special effect 1 is played for 10 seconds or the special effect 1 is played for 10 times. The number of times for which the special effect is played is the number of times for which the frame sequence of the special effect as a whole is displayed. The play order and the number of times for which a special effect is played may be set independently or in combination. If the play order is set independently, all special effects are played successively once. If the play time is set independently, all special effects are played together, with different ending times depending on the play times of the special effects. If the play order and the play time are set in combination, by default, the special effects are displayed in the display order, and only one special effect is played for a play time of the special effect, a next special effect is played. In a more flexible configuration, the play order may be configured based on a message. For example, if the special effect 1 is played first, and a message is set to the special effect 3 when the n-th frame of the special effect 1 is played, to play the special effect 3, the special effect 1 is stopped and the special effect 2 is played when the m-th frame of the special effect 3 is played. With the method of setting a play order based on a message, the starting and stopping of the special effects may be set more flexibly, such that combinations and connections between special effects are multi-variable and sufficient. With the method for setting the play order based on a message, the play time may be set or not. Alternatively, priorities of the message and the play time may also be set. For example, if the play time of the special effect 1 is set as 10 seconds, and the special effect 1 has not been played for 10 seconds when a message for the special effect 3 is set to stop the special effect 1, it may be determined whether to stop playing the special effect 1 according to the set priorities. If the priority of the play time is higher than the priority of the message, the special effect 1 is continuously played until the special effect 1 is displayed for 10 seconds. If the priority of the message is higher than the priority of the play time, the special effect 1 is stopped immediately. The above settings are all exemplary, and are given for the convenience of understanding. In practice, the play order and the play time may be combined in any ways, and the priority may also be set arbitrarily. The play order and the play time may be global parameters. For example, in a case that there are multiple face images and each face image includes multiple different special effects, the play orders and the play time of the special effects are set in a unifying manner. For example, in a case that two face images are detected, and a face 1 includes a special effect 1 and a special effect 2, and a face 2 includes a special effect 3 and a special effect 4, it may be set to play the special effect 1 first for 10 seconds, then play the special effect 3 for 2 seconds, and finally play the special effect 2 and the special effect 4 for 5 seconds. In this way, multiple special effects of multiple faces may be displayed alternatively, such that an interactive effect is realized.

In the embodiment, the parameter of the special effect further includes a play order and a play time of the special effect.

It should be understood that the setting of a trigger condition and the setting of a play order and a play time in the above two embodiments may be used in combination, and the order of the settings is not limited in the present disclosure, which may be arbitrarily changed according to actual needs. All the operations and settings that are performed before generating a parameter of the special effect are all reflected in the parameter of the special effect finally, and then the parameter is used to generate the special effect on a face recognized by an image sensor.

In the above, although the various steps in the above method embodiments are described in the above described order, those skilled in the art should understand that the steps in the embodiments of the present disclosure are not necessarily performed in the listed order, and may also be performed in a reverse, parallel, and cross order. Furthermore, those skilled in the art can also add other steps based on the above steps, and such obvious variations or equivalents are also included in the protection scope of the present disclosure, which are not described herein.

Embodiments of an apparatus according to the present disclosure are described hereinafter, the apparatus may be used to perform the steps in the embodiment of the method according to the present disclosure. For ease of explanation, only parts related to the embodiments of the present disclosure are shown, and for the specific technical details that are not disclosed, reference may be made to the embodiments of the method according to the present disclosure.

Figure 5A:
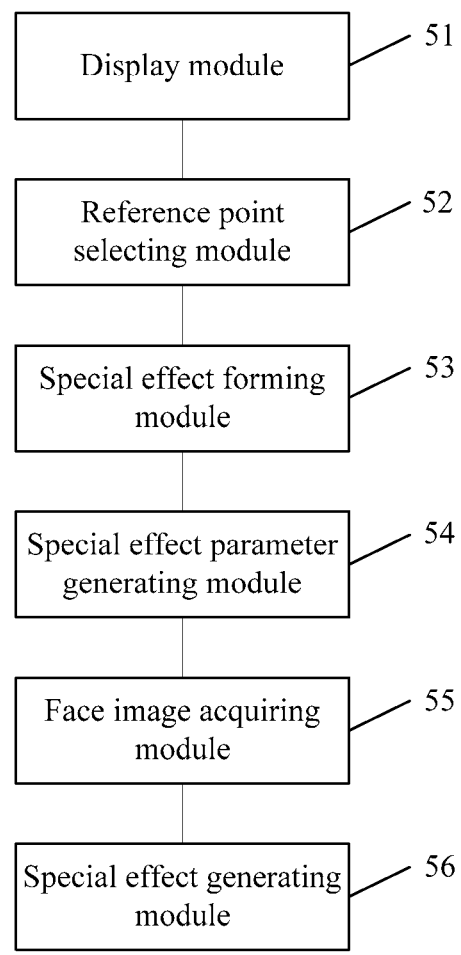
FIG. 5a is a schematic structural diagram of an apparatus for generating a special effect based on a face according to an embodiment of the present disclosure.

An apparatus for generating a special effect based on a face is provided according to an embodiment of the present disclosure. The apparatus may perform the steps in the above embodiments of the method for generating a special effect based on a face. As shown in FIG. 5a, the apparatus mainly includes: a display module 51, a reference point selecting module 52, a special effect forming module 53, a special effect parameter generating module 54, a face image acquiring module 55, and a special effect generating module 56. The display module 51 is configured to display a standard face image. The reference point selecting module 52 is configured to select a reference point on the standard face image in response to a received reference point selecting command. The special effect forming module 53 is configured to form a special effect on the standard face image in response to a received special effect forming operation. The special effect parameter generating module 54 is configured to generate a parameter of the special effect. The face image acquiring module 55 is configured to acquire a first face image recognized by an image sensor. The special effect generating module 56 is configured to generate the special effect on the first face image based on the parameter of the special effect and the reference point.

Figure 5B:
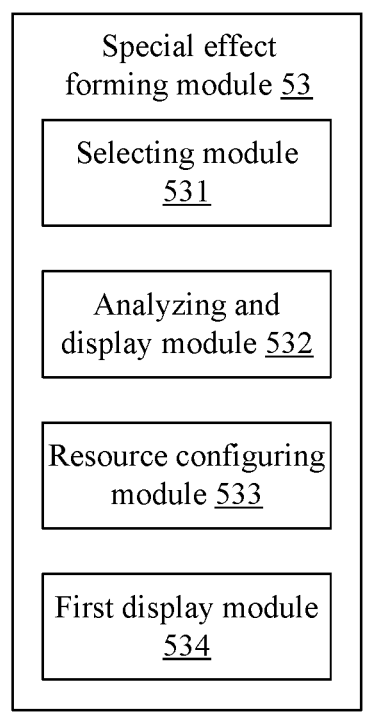

As shown in FIG. 5b, in an embodiment, the special effect forming module 53 further includes: a selecting module 531, a analyzing and display module 532, a resource configuring module 533, and a first display module 534. The selecting module 531 is configured to select a resource package in response to a received resource package selecting command. The analyzing and display module 532 is configured to analyze the resource package and display a configuration interface. The resource configuring module 533 is configured to configure a resource in the resource package in response to a received configuration command. The first display module 534 is configured to form the special effect based on the configured resource, and display the special effect on the standard face image.

The apparatus for generating a special effect based on a face corresponds to the method for generating a special effect based on a face in the embodiment shown in FIG. 1. For specific details, reference may be made to the above description of the method for generating a special effect based on a face, which are not described in detail here.

In the embodiment of the present disclosure, a face special effect is edited on a standard face image, and then the face special effect is mapped to an image acquired by an image sensor based on a relative relationship between a selected reference point and an attribute of the special effect. In a conventional technology, since a special effect is formed with a third-party tool, the flexibility in using the special effect is low, and the special effect cannot be configured in real time. Moreover, the special effect is only fixed at a fixed position of an image window, and when a face moves or rotates, the special effect cannot moves or rotates tracking the face, resulting in a reduced user experience. In this embodiment, with the special effect forming operation, the user may conveniently configure and edit a special effect. Further, since a face feature point is selected as a reference point and a relative relationship between the special effect and the reference point is recorded, the special effect changes tracking the change of the reference point no matter how a first face image acquired by an image sensor moves or rotates. Therefore, compared with the conventional technology, the difficulty and the time period in editing the special effect are greatly reduced, and the special effect always changes tracking the change of the face, thus improving the user experience.

Figure 6:
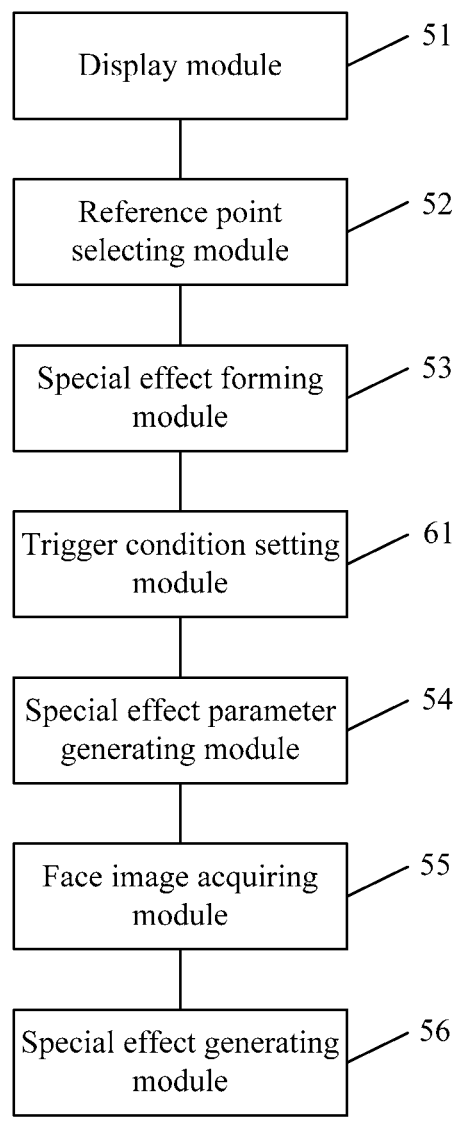
FIG. 6 is a schematic structural diagram of an apparatus for generating a special effect based on a face according to another embodiment of the present disclosure.

As shown in FIG. 6, in an embodiment, the apparatus for generating a special effect based on a face further includes a trigger condition setting module 61. The trigger condition setting module 61 is configured to set a trigger condition of the special effect in response to a received trigger condition setting command.

The apparatus for generating a special effect based on a face corresponds to the method for generating a special effect based on a face in the embodiment shown in FIG. 3. For specific details, reference may be made to the above description of the method for generating a special effect based on a face, which are not described in detail here.

Figure 7:
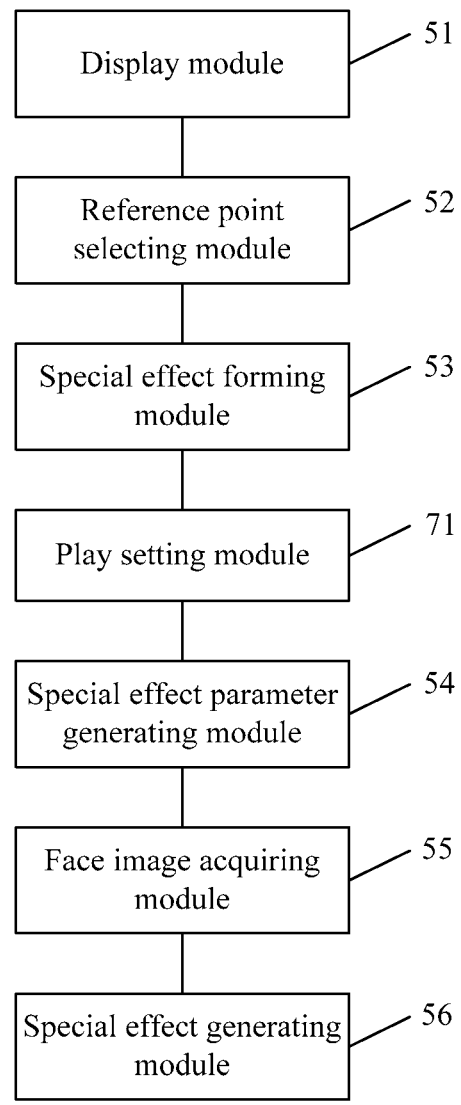
FIG. 7 is a schematic structural diagram of an apparatus for generating a special effect based on a face according to another embodiment of the present disclosure.

As shown in FIG. 7, in an embodiment, the apparatus for generating a special effect based on a face further includes a play setting module 71. The play setting module 71 is configured to set a play order and/or a play time of the special effect in response to a received play setting command.

The apparatus for generating a special effect based on a face corresponds to the method for generating a special effect based on a face in the embodiment shown in FIG. 4. For specific details, reference may be made to the above description of the method for generating a special effect based on a face, which are not described in detail here.

Detailed description of the working principle and technical effect of the embodiment of generating a special effect based on a face may refer to the above description of the embodiments of the method for generating a special effect based on a face, which are not described in detail here.

Figure 8:
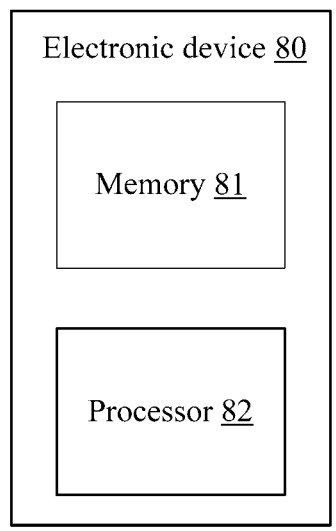
FIG. 8 is a schematic structural diagram of an electronic device according to an embodiment of the present disclosure.

FIG. 8 is a block diagram of an electronic device according to an embodiment of the present disclosure. As shown in FIG. 8, the electronic device 80 according the embodiment of the present disclosure includes a memory 81 and a processor 82.

The memory 81 is configured to store non-transitory computer readable instructions. The memory 81 may include one or more computer program products, and the computer program product may include computer readable storage medium of various forms, such as a volatile memory and/or a nonvolatile memory. The volatile memory may include, for example, a random access memory (RAM)

and/or a cache. The nonvolatile memory may include, for example, a read only memory (ROM), a hard disk, and a flash memory.

The processor 82 may be a central processing unit (CPU) or other processing unit with data processing capabilities and/or instruction execution capabilities, and may control other components in the electronic device 80 to perform desired functions. According to an embodiment of the present disclosure, the processor 82 is configured to execute the computer readable instructions stored in the memory 81, to cause the electronic device 80 to perform all or part of the steps of the method for generating a special effect based on a face according to the embodiments of the present disclosure.

Those skilled in the art should understand that in order to acquire a good user experience, well-known structures such as a communication bus and an interface may also be used in the present embodiment, and these well-known structures also fall within the protection scope of the present disclosure.

For a detailed description of the embodiment, reference may be made to the corresponding description of the above embodiments, which are not described in detail here.

Figure 9:
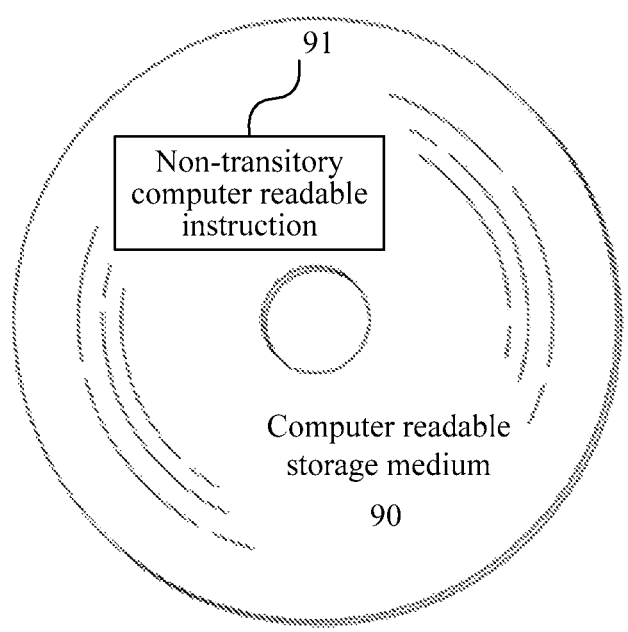
FIG. 9 is a schematic structural diagram of a computer readable storage medium according to an embodiment of the present disclosure.

FIG. 9 is a schematic diagram of a computer readable storage medium according to an embodiment of the present disclosure. As shown in FIG. 9, a computer readable storage medium 90 according the embodiment of the present disclosure stores a non-transitory computer readable instruction 91. The non-transitory computer readable instruction 91, when being executed by a processor, cause the processor to perform all or part of the steps of the method for generating a special effect based on a face according to the embodiments of the present disclosure.

The above computer readable storage medium 90 includes, but is not limited to, an optical storage medium (such as a CD-ROM and a DVD), a magneto-optical storage medium (such as an MO), a magnetic storage medium (such as a magnetic tape or a mobile hard disk), a medium having a built-in rewritable nonvolatile memory (such as a memory card), and a medium having a built-in ROM (such as an ROM cartridge).

For a detailed description of the present embodiment, reference may be made to the corresponding description of the above embodiments, which are not described in detail here.

Figure 10:
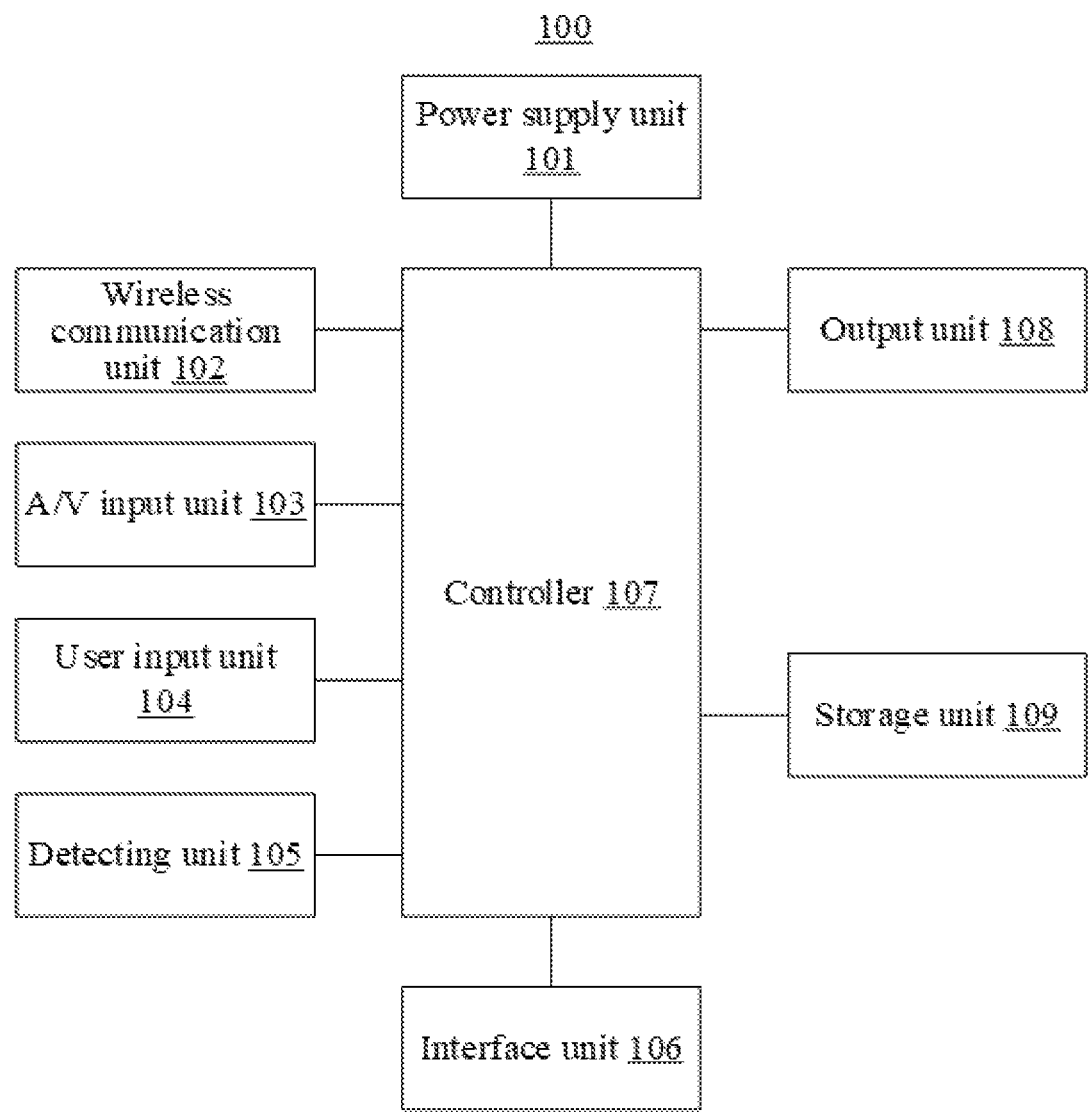
FIG. 10 is a schematic structural diagram of a terminal for generating a special effect based on a face according to an embodiment of the present disclosure.

FIG. 10 is a schematic diagram of a hardware structure of a terminal device according to an embodiment of the present disclosure. As shown in FIG. 10, a terminal device 100 for generating a special effect based on a face includes the apparatus for generating a special effect based on a face described in the above embodiments.

The terminal device may be implemented in various forms. According to the present disclosure, the terminal device may include, but is not limited to, a mobile terminal device such as a mobile phone, a smart phone, a notebook computer, a digital broadcast receiver, a personal digital assistant (PDA), a tablet (PAD), a portable multimedia player (PMP), a navigation device, a vehicle terminal device, a vehicle display terminal, an a vehicle electronic rearview mirror, and a fixed terminal device such as a digital TV and a desktop computer.

In an equivalent alternative embodiment, the terminal device may further include other components. As shown in FIG. 10, the image special effect processing terminal 100 may include a power supply unit 101, a wireless communication unit 102, an audio/video (A/V) input unit 103, a user input unit 104, a detecting unit 105, an interface unit 106, a controller 107, an output unit 108, a storage unit 109 and the like. A terminal having various components is shown in FIG. 10. It should be understood that not all the components shown in FIG. 10 are required, alternatively, more or less components may be included.

In the above embodiment, the wireless communication unit 102 is configured to provide a radio communication between the terminal 100 and a wireless communication system or a network. The A/V input unit 103 is configured to receive an audio signal or a video signal. The user input unit 104 is configured to generate key input data based on a command inputted by the user to control various operations of the terminal device. The detecting unit 105 is configured to detect: a current state of the terminal 100, a position of the terminal 100, whether there is an input of touch on the terminal 100 by the user, an orientation of the terminal 100, and an acceleration or deceleration movement and a direction of the terminal 100; and generate a command or signal for controlling an operation of the terminal 100. The interface unit 106 serves as an interface through which at least one external device may connect with the terminal 100. The output unit 108 is configured to provide an output signal in a visual, audio, and/or tactile manner. The storage unit 109 is configured to store a software program of processing and control operations which are performed by the controller 107, or temporarily store data that has been outputted or is to be outputted. The storage unit 109 may include at least one type of storage medium. Moreover, the terminal 100 may cooperate with a network storage device that performs a storage function of the storage unit 109 via a network connection. The controller 107 is configured to control the overall operation of the terminal device. In addition, the controller 107 may include a multimedia module for reproducing or playing back multimedia data. The controller 107 may be configured to perform a pattern recognition process to recognize a handwriting input or a picture drawing input performed on a touch screen as a character or an image. The power supply unit 101 is configured to receive external power or internal power under the control of the controller 107 and provide appropriate power required for operating various elements and components.

The method for generating a special effect based on a face according to various embodiments of the present disclosure may be performed by using a computer readable medium, such as computer software, computer hardware, or any combination thereof. For hardware, the method for processing a special effect on an image according to various embodiments of the present disclosure may be performed by using at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit for performing the functions described herein. In some cases, the method for generating a special effect based on a face according to various embodiments of the present disclosure may be performed in the controller 107. For software, the method for generating a special effect based on a face according to various embodiments of the present disclosure may be performed by an individual software module which is configured to perform at least one function or operation. The software code may be implemented as a software application (or a program) written in any suitable programming language, and the software code may be stored in the storage unit 109 and executed by the controller 107.

For a detailed description of the present embodiment, reference is made to the corresponding description of the above embodiments, which are not described in detail here.

The basic principles of the present disclosure are described above in conjunction with specific embodiments, however, it should be noted that the benefits, advantages, and effects mentioned in the present disclosure are merely exemplary rather than limiting, and these benefits, advantages, and effects should not be considered as necessary for the embodiments of the present disclosure. In addition, the above specific details of the present disclosure are only for the purpose of illustration and ease of understanding, rather than limiting. The above details do not limit that the present disclosure must be implemented with the above specific details.

The block diagrams of the devices, apparatuses, equipment, systems according to the present disclosure are merely illustrative examples and are not intended to require or imply that the connections, arrangements, and configurations must be performed in the manner shown in the block diagrams. As will be appreciated by those skilled in the art, these devices, apparatuses, equipment, systems can be connected, arranged, and configured in any manner. Words such as "including", "comprising", and "having" are non-inclusive words with the meaning of "including but not limited to", and may be used interchangeably therewith. The words "or" and "and" means "and/or", and may be used interchangeably therewith, unless clearly indicated. The word "such as" means "such as but not is limited to", and may be used interchangeably therewith.

In addition, as used herein, "or" used in an enumeration starting with "at least one" indicates a separate enumeration, so that an enumeration of "at least one of A, B or C", for example, means A or B or C, or AB or AC or BC, or ABC (that is, A and B and C). Moreover, the wording "exemplary" does not mean that the described examples are preferred or better than the other examples.

It should also be noted that in the system and method according to the present disclosure, the components or steps may be decomposed and/or recombined. These decompositions and/or recombinations should be considered as equivalents to the present disclosure.

Various changes, substitutions and alterations of the techniques described herein may be made without departing from the techniques taught by the appended claims. Further, the scope of the claims of the present disclosure is not limited to the specific aspects of the processes, machines, manufacture, event compensations, means, methods, and actions described above. The processes, machines, manufacture, event compensations, means, methods, or actions presently existing or to be developed that perform substantially the same functions or achieve substantially the same results as the corresponding aspects described herein may be utilized. Accordingly, the appended claims include such processes, machines, manufacture, events, means, methods, or actions fall within its scope.

The above description of the disclosed aspects is provided to enable any skilled in the art to make or use the present disclosure. Various modifications to these aspects are readily apparent to those skilled in the art, and the general principles defined herein may be applied to other aspects without departing from the scope of the present disclosure. Therefore, the present disclosure is not intended to be limited to the aspects shown herein, but is accorded the broadest scope consistent with the principles and novel features disclosed herein.

The foregoing description has been presented for purposes of illustration and description. Furthermore, the description is not intended to limit the embodiments of the present disclosure to the forms disclosed herein. Although a number of exemplary aspects and embodiments have been discussed above, those skilled in the art will recognize certain variations, modifications, changes, additions and sub-combinations thereof.

The invention claimed is:

1. A method for generating a special effect based on a face, comprising:
displaying a standard face image, wherein the standard face image comprises a plurality of feature points;
selecting at least one reference point on the standard face image in response to a received reference point selecting command, wherein the at least one reference point is selected among the plurality of feature points;
forming a special effect on the standard face image in response to a received special effect forming operation;
generating parameters of the special effect based on determining a plurality of linear difference coefficients, wherein the plurality of linear difference coefficients indicate a size of the special effect and a position of the special effect relative to the at least one reference point;
acquiring a first face image recognized by an image sensor; and
generating the special effect on the first face image based at least in part on the plurality of linear difference coefficients, wherein there is a mapping relationship between the standard face image and the first face image.

2. The method for generating a special effect based on a face according to claim 1, wherein
the standard face image comprises a plurality of regions,
the at least one reference point is located in one of the plurality of regions, and
the special effect is located in the region where the reference point is located.

3. The method for generating a special effect based on a face according to claim 2, wherein
a number of the special effect is more than one, and the more than one special effect corresponds to different reference points and is located in different regions.

4. The method for generating a special effect based on a face according to claim 1, wherein before the generating a parameter of the special effect, the method further comprises:
setting a trigger condition of the special effect in response to a received trigger condition setting command.

5. The method for generating a special effect based on a face according to claim 1, wherein before the generating a parameter of the special effect, the method further comprises:
setting at least one of a play order and a play time of the special effect in response to a received play setting command.

6. The method for generating a special effect based on a face according to claim 5, wherein
the play order is set based on a message, and
the message is set to control starting or stopping the special effect.

7. The method for generating a special effect based on a face according to claim 1, wherein
the position of the special effect and the size of the special effect are respectively determined based on a position of the at least one reference point and a distance between different reference points.

8. The method for generating a special effect based on a face according to claim 1, wherein the forming a special effect on the standard face image in response to a received special effect forming operation comprises:
selecting a resource package in response to a received resource package selecting command;
analyzing the resource package and displaying a configuration interface;
configuring a resource in the resource package in response to a received configuration command; and
generating the special effect based on the configured resource, and displaying the special effect on the standard face image.

9. The method for generating a special effect based on a face according to claim 8, wherein the configuring a resource in the resource package comprises:
configuring a size, a position, and a rotation center of the resource.

10. An electronic device, comprising:
at least one processor; and
a memory communicatively connected to the at least one processor, wherein
the memory stores instructions executable by the at least one processor, and the instructions, when being executed by the at least one processor, causes the at least one processor to perform operations, the operations comprising:
displaying a standard face image, wherein the standard face image comprises a plurality of feature points;
selecting at least one reference point on the standard face image in response to a received reference point selecting command, wherein the at least one reference point is selected among the plurality of feature points;
forming a special effect on the standard face image in response to a received special effect forming operation;
generating parameters of the special effect based on determining a plurality of linear difference coefficients, wherein the plurality of linear difference coefficients indicate a size of the special effect and a position of the special effect relative to the at least one reference point;
acquiring a first face image recognized by an image sensor; and
generating the special effect on the first face image based at least in part on the plurality of linear difference coefficients, wherein there is a mapping relationship between the standard face image and the first face image.

11. The electronic device for generating a special effect based on a face according to claim 10, wherein
the standard face image comprises a plurality of regions,
the reference point is located in one of the plurality of regions, and
the special effect is located in the region where the at least one reference point is located.

12. The electronic device for generating a special effect based on a face according to claim 11, wherein
a number of the special effect is more than one, and the more than one special effect corresponds to different reference points and is located in different regions.

13. The electronic device for generating a special effect based on a face according to claim 10, wherein before the generating a parameter of the special effect, the operations further comprise:
setting a trigger condition of the special effect in response to a received trigger condition setting command.

14. The electronic device for generating a special effect based on a face according to claim 10, wherein before the generating a parameter of the special effect, the operations further comprise:
setting at least one of a play order and a play time of the special effect in response to a received play setting command.

15. The electronic device for generating a special effect based on a face according to claim 14, wherein
the play order is set based on a message, and
the message is set to control starting or stopping the special effect.

16. The electronic device for generating a special effect based on a face according to claim 10, wherein
the position of the special effect and the size of the special effect are respectively determined based on a position of the reference point and a distance between reference points.

17. The electronic device for generating a special effect based on a face according to claim 10, wherein the forming a special effect on the standard face image in response to a received special effect forming operation comprises:
selecting a resource package in response to a received resource package selecting command;
analyzing the resource package and displaying a configuration interface;
configuring a resource in the resource package in response to a received configuration command; and
generating the special effect based on the configured resource, and displaying the special effect on the standard face image.

18. A non-transitory computer readable storage medium comprising computer instructions stored thereon, wherein the computer instructions, when being executed by a computer, cause the computer to perform operations, the operations comprising:
displaying a standard face image, wherein the standard face image comprises a plurality of feature points;
selecting at least one reference point on the standard face image in response to a received reference point selecting command, wherein the at least one reference point is selected among the plurality of feature points;
forming a special effect on the standard face image in response to a received special effect forming operation;
generating parameters of the special effect based on determining a plurality of linear difference coefficients, wherein the plurality of linear difference coefficients indicate a size of the special effect and a position of the special effect relative to the at least one reference point;
acquiring a first face image recognized by an image sensor; and
generating the special effect on the first face image based at least in part on the plurality of linear difference coefficients, wherein there is a mapping relationship between the standard face image and the first face image.

* * * * *